United States Patent
Junker et al.

(10) Patent No.: US 10,208,361 B2
(45) Date of Patent: Feb. 19, 2019

(54) METHOD FOR THE PRODUCTION OF A SEAMLESS, MULTILAYERED TUBULAR PRODUCT, AND ROUND OR POLYGONAL BLOCK FOR USE IN THIS METHOD

(71) Applicant: BENTELER STEEL/TUBE GMBH, Paderborn (DE)

(72) Inventors: Martin Junker, Verl (DE); Thomas Vietoris, Paderborn (DE); Christian Kronholz, Dülmen (DE); Albert Lorentz, Kerken (DE)

(73) Assignee: Benteler Steel/Tube GmbH, Paderborn (DE)

( * ) Notice: Subject to any disclaimer, the term of this patent is extended or adjusted under 35 U.S.C. 154(b) by 396 days.

(21) Appl. No.: 15/205,674

(22) Filed: Jul. 8, 2016

(65) Prior Publication Data
US 2017/0009313 A1    Jan. 12, 2017

(30) Foreign Application Priority Data

Jul. 9, 2015 (DE) .................. 10 2015 111 090

(51) Int. Cl.
| | |
|---|---|
| *C21D 9/08* | (2006.01) |
| *B23P 15/00* | (2006.01) |
| *B23K 5/16* | (2006.01) |
| *B23K 5/18* | (2006.01) |
| *B23K 9/04* | (2006.01) |

(Continued)

(52) U.S. Cl.
CPC .................. *C21D 9/08* (2013.01); *B23K 5/16* (2013.01); *B23K 5/18* (2013.01); *B23K 9/048* (2013.01); *B23K 9/232* (2013.01); *B23K 15/0086* (2013.01); *B23K 15/0093* (2013.01); *B23K 26/34* (2013.01); *B23P 15/00* (2013.01); *C21D 8/10* (2013.01); *C21D 8/105* (2013.01); *C21D 9/50* (2013.01); *F16L 9/02* (2013.01); *F16L 9/14* (2013.01); *B23K 2101/06* (2018.08); *B23K 2103/04* (2018.08); *B23K 2103/05* (2018.08);

(Continued)

(58) Field of Classification Search
CPC ............ B23K 15/0086; B23K 15/0096; B23K 2101/06; B23K 2103/04–2103/05; B23K 2103/18; B23K 5/16; B23K 5/18; B23K 9/018; B23K 9/232; C21D 8/10; C21D 8/105; C21D 9/08; C21D 9/50; C21D 2201/00; C21D 2251/02

See application file for complete search history.

(56) References Cited

FOREIGN PATENT DOCUMENTS

| | | |
|---|---|---|
| DE | 40 30 389 | 1/1992 |
| DE | 695 01 019 | 6/1998 |
| DE | 10 2009 060 594 | 6/2011 |

*Primary Examiner* — Lois L Zheng
(74) *Attorney, Agent, or Firm* — Henry M. Feiereisen, LLC

(57) ABSTRACT

In a method for the production of a seamless, multilayered tubular product, a further layer is applied through hardfacing on a base layer of a round or polygonal block, with the further layer made of a metallic material which is different than a metallic material of the base layer. The round or polygonal block with hardfaced further layer is hot formed to produce a tubular product with reduced wall thickness and outer perimeter in one or more stages. A diffusion layer is established between the base layer and the further layer through heat treatment before hot forming and/or after hot forming, thereby producing a thickness of the diffusion layer of at least 5 μm with the proviso that the thickness of the diffusion layer is 0.1% to 50% of a thickness of the further layer, with the thickness of the further layer being equal to or greater than 100 μm.

15 Claims, 1 Drawing Sheet

(51) Int. Cl.
    *B23K 9/23*          (2006.01)
    *B23K 15/00*       (2006.01)
    *B23K 26/34*       (2014.01)
    *C21D 9/50*         (2006.01)
    *C21D 8/10*         (2006.01)
    *F16L 9/02*         (2006.01)
    *F16L 9/14*         (2006.01)
    *B23K 101/06*     (2006.01)
    *B23K 103/04*     (2006.01)
    *B23K 103/18*     (2006.01)

(52) U.S. Cl.
    CPC ...... *B23K 2103/18* (2018.08); *C21D 2201/00* (2013.01); *C21D 2251/02* (2013.01)

METHOD FOR THE PRODUCTION OF A SEAMLESS, MULTILAYERED TUBULAR PRODUCT, AND ROUND OR POLYGONAL BLOCK FOR USE IN THIS METHOD

CROSS-REFERENCES TO RELATED APPLICATIONS

This application claims the priority of German Patent Application, Serial No. 10 2015 111 090, filed Jul. 9, 2015, pursuant to 35 U.S.C. 119(a)-(d), the disclosure of which is incorporated herein by reference in its entirety as if fully set forth herein.

BACKGROUND OF THE INVENTION

The present invention relates to a method for the production of a seamless, multilayered tubular product, and round or polygonal block for use in this method.

The following discussion of related art is provided to assist the reader in understanding the advantages of the invention, and is not to be construed as an admission that this related art is prior art to this invention.

Multilayered tubular products of different metallic layers are known in the art to be produced for example through co-extrusion in an extrusion process. This process is complex. Also productivity of co-extrusion is comparably inadequate. Another approach to produce a multilayered or also bimetal tube involve manual welding of a further layer upon the tube. Also this process is fairly complex and involves also a relatively complicated heat treatment. There is also the possibility to mechanically join various layers of a bimetal tube, e.g. through an internal high-pressure forming process. This also involves high manufacturing costs.

It would therefore be desirable and advantageous to address prior art shortcomings.

SUMMARY OF THE INVENTION

According to one aspect of the present invention, a method for the production of a seamless, multilayered tubular product includes hardfacing a further layer on a base layer of a round or polygonal block, with the further layer being made of a metallic material which is different than a metallic material of the base layer, hot forming the round or polygonal block with the hardfaced further layer to produce a tubular product with reduced wall thickness and outer perimeter in one or more stages, and establishing a diffusion layer between the base layer and the further layer through heat treatment at least in one of the phases selected from the group consisting of before hot forming and after hot forming, thereby producing a thickness of the diffusion layer of at least 5 µm with the proviso that the thickness of the diffusion layer is 0.1% to 50% of a thickness of the further layer, with the thickness of the further layer being equal to or greater than 100 µm.

In accordance with the present invention, multilayered products can be produced by hot forming, e.g. hot rolling, of a multilayered starting product, with one layer of the starting product being applied through hardfacing, when deposited on the base layer which is made of a metallic material that is different from the metallic material of the further layer. The processed metallic materials have different properties in terms of their chemical or thermal or mechanical properties or in their microstructure. Currently preferred is a combination of chemically or thermally or mechanically different resistant materials.

After undergoing the hardfacing process, the block provided with the at least one further layer is shaped through hot forming in one of more stages into the tubular product with reduced wall thickness and outer perimeter. The thickness of the hardfaced layer decreases hereby but should not drop below a thickness of 100 µm. After hardfacing, the block may be at least partly perforated in a first stage. Perforation may also be carried out in a first forming stage.

A diffusion layer is established between the base layer and the hardfaced layer as a result of heat treatment before and/or during the hot forming step. The thickness of the diffusion layer should range from 0.1% to 50% of the thickness of the hardfaced layer on the finished, hot rolled tubular product. The thickness of the diffusion layer should amount to at least 5 µm on the finished, hot rolled tubular product. Currently preferred is a thickness of maximal 150 µm.

Rolled tubular products can be produced with significantly higher productivity and much more cost-effectively than tubes that have been produced through co-extrusion, refinishing, or mechanical joining.

An essential component of the invention relates to the presence of a round or polygonal block. It represents the starting product of the hot rolled tubular product. The round or polygonal block may involve a square billet, octagonal billet, or a round billet. The block can have a ratio between 2 and 8 between circumference and length. Currently preferred is a ratio between 2.8 and 4. The circumference is advantageously 450 mm to 750 mm. The block may be configured over part of its length as hollow block which may be pre-perforated to be able to shape it in a push bench process for example.

The block does not involve a so-called bloom but either involves a solid billet or a thick-walled hollow block that may also be referred to as perforated solid cylinder.

Advantageously, the block is made of steel. However, the present invention should not be limited to metallic blocks of ferrous material or to deposits of hardfaced layers of ferrous materials.

The base layer formed by the block and the layer applied through hardfacing are connected to one another by a material joint and form there between a diffusion layer, the thickness of which can be selectively adjusted. The thickness of the diffusion layer may be increased through tailored heat treatment up to 50% of the thickness of the hardfaced layer on the finished, hot rolled tubular product. The diffusion layer extends with substantially constant thickness advantageously over the entire contact area between the base layer and the hardfaced layer.

According to another advantageous feature of the present invention, the round or polygonal block can be heat treated without subjecting the further layer to a material removing process, and subsequently shaped hot into the tubular product. Surface irregularities can be evened out during hot rolling. The hardfaced block can therefore be easily rolled. During rolling, the round or polygonal block is perforated, stretched and shaped into the tubular product, with the thickness of the wall and the outer perimeter of the tubular product being reduced. A length increase by at least tenfold is realized hereby. The thickness of the diffusion layer should range between 1% and 20% of the hardfaced layer of the hot rolled tubular product, in particular when a steel-steel pairing is involved.

The thickness of the diffusion layer is influenced by the heat treatment. Advantageously, the heat treatment is executed at a temperature below a lowest melting point of the metallic materials of the further layer and the base layer.

The heat treatment is executed after the hardfacing process. Advantageously, the block provided with the hardfaced layer is heated in a rotary hearth furnace over a time period of 70 to 150 minutes to a target temperature in a range of 800° C. to 1400° C. Currently preferred is a temperature above 1200° C., in particular in a range from 1250° C. to 1400° C.

After undergoing a first forming process and before a next forming process, a further heat treatment is carried out at a temperature in a range of 800° C. to 1400° C. Currently preferred is a temperature above 1200° C., in particular in a range from 1250° C. to 1400° C. The temperature should be held over a time period of 5 to 15 minutes, advantageously 5 to 10 minutes, before undergoing a further heat treatment. Currently preferred is a time period of 8 to 10 minutes.

According to another advantageous feature of the present invention, the hardfaced layer can have a thickness in a range of 1 to 10 mm. The thickness is greatly decreased during the subsequent hot forming process. The decrease in thickness is implemented during hot rolling, e.g. by inclined rolling, push bench process, and stretch-reducing rolling. While the joined layers undergo reduction in thickness, also the outer perimeter or outer diameter is reduced. The reduction of the outer diameter amounts to advantageously at least 30% in relation to the outer diameter of the block. Currently preferred is a reduction of at least 50%. The diameter reduction may be realized through hot rolling on a push bench, by inclined rolling, and by stretch-reducing rolling. Optionally, the hot rolled tubular product may then undergo a cold drawing process.

Essential for the quality of the multilayered tube is the production and composition as well as further processing of the block. Hardfacing causes an undulated block surface as a result of the neighboring welding beads. The waviness may be reduced in part, when a multilayered weld application is involved, by hardfacing the welding beads in offset relation by half their width. The finished rolled tubular product with the hardfaced layer no longer has any visible waviness, caused by the hardfacing process. The presence of the initial waviness can, however, be verified in the grinding pattern of the diffusion layer of the finished tubular product.

The surface finish of the base layer, i.e. of the uncoated block itself, is secondary for the present invention. There is no need for the hardfaced block to undergo a material removing process before executing the hot forming process in order to produce the tubular product.

According to another advantageous feature of the present invention, hardfacing can be applied on a radially outer surface of the base layer. The afore-mentioned method steps are, however, equally applicable to apply hardfacing on a radially inner surface, when a hollow block is involved.

The quality of the finished tubular product is primarily also dependent on the hot forming of the multilayered block. Hot forming is advantageously carried out using a push bench process. The present invention enables also other types of hot forming such as inclined rolling or hot pilgering with mandrel. During hot tube production, the diffusion layer grows between the layers to a desired minimum layer thickness. At the same time a potential wave shape, caused by hardfacing, can be evened out. When heating for executing the hot rolling process, e.g. in a rotary hearth furnace, and optionally carrying out intermediate annealing between two hot forming steps, the diffusion layer can be adjusted in the finished tubular product to a currently preferred thickness of above 1 μm.

According to another aspect of the present invention, a round or polygonal block for the production of a seamless tubular product includes a base layer made of metallic material, and a further layer applied by a hardfacing process upon the base layer and being made of a metallic material which is different from the metallic material of the base layer.

Hardfacing can be executed in longitudinal direction and/or circumferential direction of the block and may cause a slightly uneven surface. Hardfacing may also be executed in multiple layers. The welding beads of successive layers are advantageously disposed offset to one another. Through multilayered hardfacing, layers with thicknesses of advantageously 3 mm to 10 mm can be produced in the initial state of the block.

The composition of the block is determinative for the properties of the finished tubular product. Advantageously, the different metallic materials involve steels which can be best suited to the application of the tubular product at hand. For example, the base layer, i.e. the block, may be made of a heat-resistant steel alloy, whereas the hardfaced layer may be made of high-grade steel, stainless austenitic steel, stainless ferritic steel, or multiphase steel with austenitic ferritic structure. When depositing on the inside, an example of a heat-resistant steel can include 16Mo3. Such a tubular product is useful for example as boiler tube, i.e. for applications at elevated temperatures.

Conversely, tubular products for application as conveying tube or conduit may be made on the outside e.g. of construction steel according to EN10025-1:2005 and on the inside with a layer made of high-grade steel, stainless austenitic steel, or stainless ferritic steel.

When using a tubular product as driveshaft, the base layer may be made of construction steel according to EN10025-1:2005 and the outer hardfaced layer may be made of austenitic or hardenable steel alloys which are joined to the base layer by the afore-mentioned diffusion layer.

Such tubular products may also find application as conveyor rollers, e.g. for use in furnaces, or in transportation of piece goods, or as hydraulic cylinder. The radially outer surfaces of such tubular products are suitably free of rust. Thus, the outer hardfaced layer may be made of high-grade steel, stainless austenitic steel, or stainless ferritic steel as well as stainless martensitic steels or duplex steels with ferrite/austenite mixture, whereas the base layer may be made of medium-alloy steel or low-alloy steel. This material pairing is especially suitable to undergo a hardfacing process. When application as a hydraulic cylinder housing is involved, a reverse layer configuration is appropriate because of the greater stress to which the inner surface is subjected.

According to another advantageous feature of the present invention, the hardfaced layer may be made of a steel alloy with 0.05 to 2.06 by weight-% of carbon with austenitic structure, or ferritic pearlitic structure, or martensitic structure, or any combination thereof, with a base layer being made with a cost-efficient steel alloy, like construction steel.

The invention is not limited to two-layered tubular products. A three-layer configuration is appropriate in tubular products in which a layer is deposited by hardfacing on both inside and outside of the base layer. Multilayered coatings on the outer side of the base layer and/or the inner side of the base layer are possible as well.

The invention is characterized by a relatively cost-effective manufacture in the absence of any material removing process of the block prior to heat treatment. Diffusion layers are realized that have smooth transitions between the layers to be joined. Bonding can easily be adjusted and is very homogenous at the same time. As a result, a smooth thermal transition is realized between the two layers. Unlike welding or pressing of a second tube onto a first tube, there is no need for subsequent heat treatment of the transition zone on the first tube. In addition, hot rolling results in a transition zone without shrink marks between the individual layers. The very economical manufacture enables to produce multilayered tubes with superior surface properties, established in particular by the stretch-reducing process. This involves a reduction in diameter of the tube without the need for an internal tool, by passing through a number of 3-roll stands. A method according to the present invention may therefore be integrated without additional machines or tools in existing manufacturing processes and facilities of the hot tube production.

BRIEF DESCRIPTION OF THE DRAWING

Other features and advantages of the present invention will be more readily apparent upon reading the following description of currently preferred exemplified embodiments of the invention with reference to the accompanying drawing, in which.

DETAILED DESCRIPTION OF PREFERRED EMBODIMENTS

Figure 1:
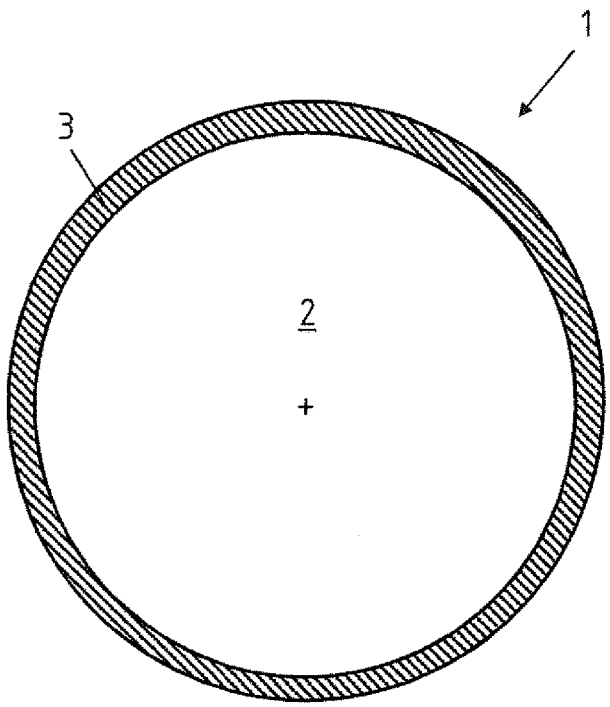
FIG. 1 is a cross section of a tubular product.

Throughout all the figures, same or corresponding elements may generally be indicated by same reference numerals. These depicted embodiments are to be understood as illustrative of the invention and not as limiting in any way. It should also be understood that the figures are not necessarily to scale and that the embodiments may be illustrated by graphic symbols, phantom lines, diagrammatic representations and fragmentary views. In certain instances, details which are not necessary for an understanding of the present invention or which render other details difficult to perceive may have been omitted.

Turning now to the drawing, and in particular to FIG. 1, there is shown, by way of example, a cross section of a round block, generally designated by reference numeral 1. The round block 1 involves a solid body with a base layer 2 which forms the core of the round block 1. A further layer 3 is applied by hardfacing onto the base layer such as to embrace the entire base layer 2 radially about the circumference. The round block 1 represents the starting material for the production of a tubular product.

Figure 2:
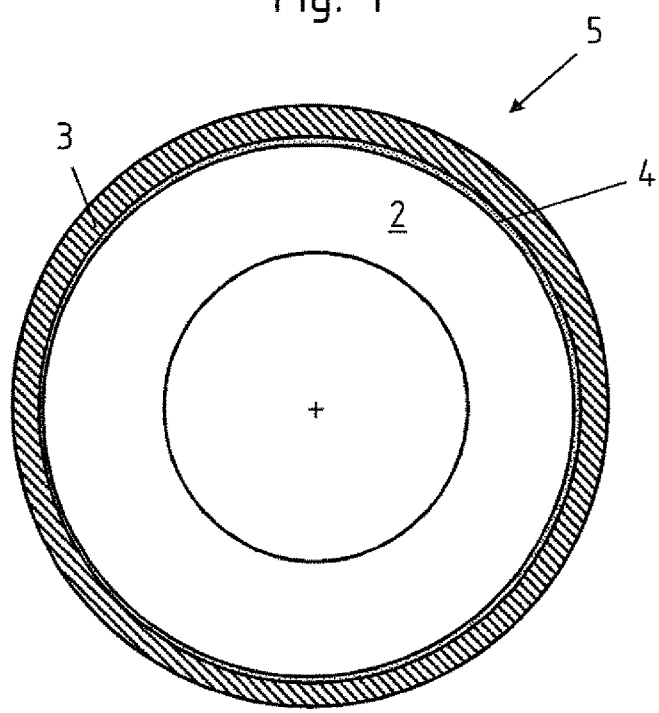
FIG. 2 is a cross section of a tubular product produced from the round block of FIG. 1 in accordance with the present invention.

FIG. 2 is a cross section of a tubular product, generally designated by reference numeral 5 and produced from the round block 1. The tubular product 5 is formed with a perforation after undergoing two heat treatments and several hot forming steps, with the heat treatments causing formation of a diffusion layer 4 between the base layer 2 and the hardfaced further layer 3.

While the invention has been illustrated and described in connection with currently preferred embodiments shown and described in detail, it is not intended to be limited to the details shown since various modifications and structural changes may be made without departing in any way from the spirit and scope of the present invention. The embodiments were chosen and described in order to explain the principles of the invention and practical application to thereby enable a person skilled in the art to best utilize the invention and various embodiments with various modifications as are suited to the particular use contemplated.

What is claimed as new and desired to be protected by Letters Patent is set forth in the appended claims and includes equivalents of the elements recited therein:

What is claimed is:

1. A method for the production of a seamless, multilayered tubular product, comprising:
   hardfacing a further layer on a base layer of a round or polygonal block, with the further layer being made of a metallic material which is different than a metallic material of the base layer;
   hot forming the round or polygonal block with hardfaced further layer to produce a tubular product with reduced wall thickness and outer perimeter in one or more stages; and
   establishing a diffusion layer between the base layer and the further layer through heat treatment at least in one of the phases selected from the group consisting of before hot forming and after hot forming, thereby producing a thickness of the diffusion layer of at least 5 μm on the tubular product, with the proviso that the thickness of the diffusion layer is 0.1% to 50% of a thickness of the further layer on the tubular product, with the thickness of the further layer being equal to or greater than 100 μm.

2. The method of claim 1, wherein the round or polygonal block is heat treated without subjecting the further layer to a material removing process, and subsequently shaped hot into the tubular product.

3. The method of claim 1, wherein the round or polygonal block is made of a steel material.

4. The method of claim 1, wherein the further layer is made of a steel material for hardfacing the base layer.

5. The method of claim 1, wherein the heat treatment is executed at a temperature below a lowest melting point of the metallic materials of the further layer and the base layer.

6. The method of claim 1, wherein the metallic material of the further layer is a steel material which is different than a steel material for the base layer, with the heat treatment being executed before the hot forming step at a heating time of 70 to 150 minutes and a target temperature of 800° C. to 1400° C.

7. The method of claim 1, wherein the metallic material of the further layer is a steel material which is different than a steel material for the base layer, with the heat treatment being executed after the hot forming step at a temperature of 800° C. to 1400° C. and a retention time between 5 to 15 minutes.

8. The method of claim 1, wherein the further layer has a mean starting thickness in a range of 1 to 10 mm before hardfacing the base layer.

9. The method of claim 1, wherein the round or polygonal block is hot formed into the tubular product using a push bench process.

10. A round or polygonal block for the production of a seamless tubular product, comprising:
    a base layer made of metallic material; and
    a further layer applied by a hardfacing process upon the base layer and being made of a metallic material which is different from the metallic material of the base layer;
    wherein the further layer has a thickness which alternates in longitudinal direction and/or circumferential direction before the round or polygonal block undergoes a hot forming process.

11. The round or polygonal block of claim 10, further comprising a plurality of said further layer formed by hardfacing on the base layer.

12. The round or polygonal block of claim 11, wherein the plurality of said further layer are made of different materials.

13. The round or polygonal block of claim 10, wherein the base layer is made of a steel material, said further layer being made of a steel material with 0.05 to 2.06 by weight-% of carbon with austenitic structure, or martensitic structure, or ferritic pearlitic structure, or any combination thereof, or of a nickel-based alloy or other non-ferrous metal.

14. The round or polygonal block of claim 10, wherein the base layer is made of a steel material with 0.05 to 2.06 by weight-% of carbon, said further layer being made of a steel material selected from the group consisting of high-grade steel, stainless austenitic steel, stainless ferritic steel, multiphase steel with austenitic ferritic structure, or a nickel-based alloy or non-ferrous metal.

15. The round or polygonal block of claim 10, configured as hollow block at least over part of a length thereof.

* * * * *